United States Patent
Mak et al.

(10) Patent No.: US 8,815,133 B2
(45) Date of Patent: Aug. 26, 2014

(54) METHOD OF MAKING A CEMENTITIOUS PRODUCT

(75) Inventors: Swee Liang Mak, Vermont South (AU); Genrietta Shapiro, East Kilda (AU); David James Bell Ritchie, Carrum Downs (AU); Rodney William Banks, Edithvale (AU); Geoffrey William Quick, Kew East (AU)

(73) Assignee: HySSIL Pty Ltd., Melbourne (AU)

( * ) Notice: Subject to any disclaimer, the term of this patent is extended or adjusted under 35 U.S.C. 154(b) by 1396 days.

(21) Appl. No.: 10/541,130

(22) PCT Filed: Jan. 15, 2004

(86) PCT No.: PCT/AU2004/000055
§ 371 (c)(1), (2), (4) Date: Jun. 22, 2006

(87) PCT Pub. No.: WO2004/063124
PCT Pub. Date: Jul. 29, 2004

(65) Prior Publication Data
US 2006/0243169 A1    Nov. 2, 2006

(30) Foreign Application Priority Data
Jan. 15, 2003    (AU) ................. 2003900156

(51) Int. Cl.
*C04B 38/10* (2006.01)
*C04B 38/02* (2006.01)
*C04B 38/00* (2006.01)
*C04B 40/02* (2006.01)

(52) U.S. Cl.
CPC ......... *C04B 38/0064* (2013.01); *C04B 40/0295* (2013.01); *C04B 38/02* (2013.01); *C04B 38/0087* (2013.01)

USPC .............. 264/51; 264/54; 264/50; 264/41

(58) Field of Classification Search
CPC   C04B 38/0054; C04B 38/0064; C04B 38/08; C04B 38/0022; C04B 38/0074; C04B 38/0615; C04B 38/106; C04B 38/0009; C04B 38/02; C04B 38/00; C04B 38/085
USPC ..................................... 264/41–55
See application file for complete search history.

(56) References Cited

U.S. PATENT DOCUMENTS 3,402,228 A    9/1968   Wood et al.
4,124,669 A  * 11/1978   Urmston ............... 264/42

(Continued)

FOREIGN PATENT DOCUMENTS

DE    10 29 278 B    4/1958
EP    0 647 603 A1   4/1995

(Continued)

OTHER PUBLICATIONS

Supplementary European Search Report dated Mar. 2, 2010 corresponding to EP 04 70 2259.

*Primary Examiner* — Jodi C Franklin
(74) *Attorney, Agent, or Firm* — Sughrue Mion, PLLC (57) ABSTRACT

A method of manufacturing a porous cementitious product, which method comprises: forming a cementitious premix; casting the premix in a desired configuration; generating gas bubbles within the premix; and curing the premix, wherein gas bubbles are generated and/or collapsed at specific locations within the premix in order to produce a porosity profile along a cross-section of the product such that the product comprises a relatively low density core region and higher density outer regions.

29 Claims, 1 Drawing Sheet

(56) References Cited

U.S. PATENT DOCUMENTS

| | | | | |
|---|---|---|---|---|
| 4,351,867 | A * | 9/1982 | Mulvey et al. | 428/70 |
| 5,039,249 | A * | 8/1991 | Hansen et al. | 404/84.5 |
| 5,114,617 | A * | 5/1992 | Smetana et al. | 252/378 P |
| 5,397,516 | A * | 3/1995 | Sikaffy | 264/42 |
| 5,641,815 | A | 6/1997 | Fehlmann | |
| 5,775,047 | A * | 7/1998 | Jensen | 52/596 |
| 5,908,521 | A * | 6/1999 | Ainsley et al. | 156/43 |
| 6,383,421 | B1 * | 5/2002 | Phipps | 264/42 |
| 2002/0038616 | A1 * | 4/2002 | Henrichsen | 106/713 |
| 2002/0047223 | A1 * | 4/2002 | Jensen | 264/40.4 |
| 2002/0117086 | A1 * | 8/2002 | Shi et al. | 106/672 |
| 2002/0132882 | A1 * | 9/2002 | Hilton et al. | 524/4 |
| 2002/0139082 | A1 * | 10/2002 | DeFord et al. | 52/783.1 |

FOREIGN PATENT DOCUMENTS

| | | |
|---|---|---|
| EP | 1 184 145 A2 | 3/2002 |
| GB | 1 330 458 A | 9/1973 |
| GB | 2 324 105 A | 10/1998 |
| JP | 07-138084 A | 5/1995 |
| JP | 2000/239075 A | 9/2000 |
| JP | 2002-326882 A | 11/2002 |
| WO | WO 03/022776 A | 3/2003 |

* cited by examiner

METHOD OF MAKING A CEMENTITIOUS PRODUCT

CROSS-REFERENCE TO RELATED APPLICATION

This Application is a 371 of PCT/AU2004/000055, filed Jan. 15, 2004; the disclosure of which is incorporated herein by reference.

The present invention relates to a cementitious product, to processes for making such products and to the uses of the products Cementitious products are used in a wide variety of applications depending on their properties. For lightweight cementitious products, two important properties include strength and density. For load bearing applications it is desirable to have a relatively high compressive strength and a relatively low density. The compressive strength of conventional cement based materials such as concrete used in the building industry typically ranges from 15-50 MPa (even though products with compressive strengths ranging between 15-25 MPa will often provide useful load bearing capabilities). The density of 'normal weight concrete' typically range between 2300-2600 kg/m$^3$ Those cementitious products termed 'lightweight' may have densities ranging between 300-1800 kg/m$^3$ with the former being used mainly as thermally insulative materials. In this context, it would be desirable to provide a cementitious product which has reduced density without unduly compromising compressive strength.

One way this can be done is to replace significant volume of the material with constituents of relatively lower specific gravity. Where lightweight coarse aggregates are used to substitute normal weight aggregates, the product is known as lightweight aggregate concrete (LWAC). Typically this approach produces concrete with bulk densities in the range of 1400-2000 kg/m$^3$, with density variations controlled through the type and volume of lightweight aggregates used ie by changing concrete mix design. It would be desirable to provide a method by which the density of a single cementitious formulation may be manipulated. Some lightweight aggregates are also known to be chemically reactive and there is also a higher degree of quality control needed in the production of LWACs.

Other attempts to reduce the density of cementitious products have involved the introduction of low density voids or bubbles into the cementitious mixture, and the resultant products are usually referred to as "cellular" concretes. These typically have densities in the range of 500 to 1000 kg/m$^3$ but their compressive strengths are seldom in excess of 5 MPa. Consequently, they are often unsuitable for load bearing applications. Indeed, one of the main applications for such products is for thermal insulation. It would be desirable to provide cementitious products with similar densities but with enhanced compressive strength. Furthermore, in order to promote enhanced hardening, some cellular concretes are typically prepared using high pressure autoclaves. The equipment costs involved are very high, and it would be desirable to provide an alternative means for preparing suitably low density cementitious products using relatively simple and less expensive techniques.

The present invention seeks to provide a method of manufacturing a cementitious product which satisfies the aforementioned needs and overcomes the disadvantages associated with the prior art techniques described.

Accordingly, the present invention provides a method of manufacturing a porous cementitious product, which method comprises:

forming a cementitious premix;
casting the premix in a desired configuration;
generating gas bubbles within the premix; and
curing the premix,
wherein the gas bubbles are generated and/or collapsed at specific locations within the premix in order to produce a porosity profile along a cross-section of the product such that the product comprises a relatively low density core region and higher density outer regions, wherein a formwork is used for shaping the premix in the desired configuration, wherein the premix is confined in the formwork in order to contribute to the desired porosity profile, and wherein gas bubbles at an outer surface of the premix are caused to collapse to produce a relatively dense skin.

In accordance with the invention it is possible to vary the density of a given premix by varying the volume and distribution of gas bubbles present in the final product. This makes it possible to manufacture products with varying strength to density ratios from a single premix composition.

The cementitious products of the present invention are formed from a premix of conventional cementitious components. These include Portland cement, fly-ash, silica fume, other mineral additives, fillers and chemical admixtures. The premix may be formulated with appropriate organic and/or inorganic binders and fillers, including organic and inorganic polymers known in the art to suit performance requirements. All such components described are commercially available. The premix is prepared by usual techniques by mixing the various components with water. The premix is then cast into a formwork (mould) reflecting the intended configuration of the final product.

Generation of gas bubbles in the premix results in a volume increase of the premix. In order to achieve the required porosity profile one or more steps are taken to causing generation and/or collapsing of gas bubbles at specific locations within the premix.

In one embodiment gas bubbles may be generated by incorporation in the premix of a heat-activated gas-generating agent. This would be incorporated in the premix at the mixing stage. Preferably, the gas-generating agent is aluminium powder or a gas-generating reagent including aluminium powder. Aluminium reacts with alkalis present in a cement slurry to produce hydrogen gas. The reaction is heat-activated, the optimal activation temperature being from 35 to 45° C. Gas-generating agents suitable for incorporation into the premix are commercially available. The extent of gassing may be manipulated by varying the amount of gas-generating agent included in the premix. Use of this kind of technique causes gas generation throughout the premix so that bubble migration and collapsing is employed to achieve the requisite porosity profile. This is discussed in greater detail below.

When using a heat-activated gas-generating agent, the method usually involves rapidly elevating the temperature of the premix to within the temperature range necessary for gas generation to take place. The premix may be heated in a variety of ways and may be carried out either when mixing the components of the premix with water (typically within 5-20 minutes of adding water to the premix components) and/or when casting of the premix in a formwork. Elevation of premix temperature may be achieved by using pre-heated materials and/or by exploiting the energy imparted by the apparatus used for mixing, such as a high shear mixer.

High shear mixing may also be applied to control the temperature and/or rheology of the premix so that the premix undergoes the desired volume change on gassing.

Preferably, the invention involves the use of mix formulations that provide sufficient pot life such that the onset of gas generation occurs only after the premix has been poured into the formwork. Therefore, the premix viscosity is also an important factor in achieving the desired porosity profile in the final product. Ideally, when poured into the formwork the premix has a balanced viscosity such that gas bubbles may be generated with ease and migrate (rise) through the premix whilst not being lost altogether from the bulk of the premix. Bubble migration is important to production of the desired porosity profile and it is possible to control bubble migration by manipulating viscosity. A highly viscous premix may prevent bubbles from forming and rising whereas a premix which is too thin will result in bubble loss from the premix matrix. In practice the viscosity may be controlled by varying the mix temperature, blending of fine materials into the premix to obtain desired particle gradation for optimal flow properties and/or by incorporation into the premix of appropriate additives, such as mineral or chemical additives or admixtures. For instance, a superplasticising admixture may provide sufficient fluidity for the premix to be self-levelling whilst retaining the necessary viscosity to permit bubble migration and retention. The use of superplasticising admixtures to regulate the viscosity in order to achieve optimal gassing and volume change also confers an additional benefit of enabling the premix to be manufactured using a relatively low water content. An advantage of using a premix with a relatively low water content is the relatively low residual free moisture content in the product after primary curing is completed. One key impact of having a relatively low residual free moisture content is a reduction in the amount of shrinkage due to progressive drying.

Another potential advantage is that the product may achieve an equilibrium moisture condition with the ambient surroundings relatively quicker when compared with products that have a high residual free moisture content (as is the case with many autoclaved products). This relatively quicker equilibration of moisture condition allows the surface to be painted, coated or finished more quickly e.g. with tiles or other coverings, without the concern of long term moisture egress.

A formwork is used for shaping the premix into the desired configuration. Since foaming results in a volume increase of the premix, the formwork is underfilled, usually from 30 to 50% by volume of the formwork mould. In the embodiment described above the foamed premix is confined in the formwork in order to contribute to the desired porosity profile. Essentially, confinement involves using a formwork with a lid in order to restrain rising of the premix and cause collapsing of the expanding mixture on contact with the lid. Alternatively, collapsing of the expanding mixture may be achieved by techniques such as screeding, trowelling, and/or rolling. Depending upon the equipment used screeding and/or trowelling may be carried out with vibration. In this case repeated application of such techniques may be required to achieve the desired effect. It will be appreciated that these techniques are in themselves forms of "confinement" since they promote bubble collapsing (at the surface of the premix). The wall surfaces of the formwork may also cause collapsing of the expanding mixture in contact with their surfaces. Collapsing of the expanding mixture results in production of a relatively dense skin at the outer surfaces of the product. The floor of the formwork may also cause some bubble collapsing although migration of bubbles away from the floor is likely to be responsible for formation of a less porous outer region there. The use of an appropriate vibration technique will also assist with upward bubble migration and help densify the bottom skin region that is in contact with the formwork.

For suitable confinement the lid and formwork surfaces in contact with the premix must have sufficient stiffness and thermal stability to provide resistance against uplift pressure and any heat generated during gassing of the premix. The lid of the formwork is preferably fabricated in such a way so as to allow gas dissipation when gas bubbles collapse at the premix/lid interface. For instance, the lid may be lined with a semi-porous membrane of fabric or mesh to facilitate gas dissipation. The various surfaces of the formwork in contact with the premix (including the lid) may include surface relief in order to produce a patterned surface on the product.

In an embodiment of the invention the entire formwork may be vibrated vertically and/or laterally at an appropriate frequency (e.g. 50 Hz in the case of vertical vibration and from 1 to 5 Hz in the case of lateral vibration) and amplitude in order to achieve an even distribution of slurry within the formwork, to control the cross-sectional bubble distribution and/or to improve the quality of frnish of the product surfaces. Vibration may assist migration of gas bubbles up through the premix resulting in increased density at lower regions of the premix. Vibration may also lead to increased density at upper regions of the premix caused by migration and collapsing of bubbles due to confinement. As noted, confinement of the upper surface of the premix may be achieved by use of a lid, or by screeding, trowelling and/or rolling.

In an alternative embodiment of the invention gas bubbles may be introduced at selected locations into a cast premix by use of sparging apparatus. Essentially, this involves injecting gas (typically air) into the premix using one or more sparging lances. The lance is an elongate hollow member (usually a tubular member) having a series of holes through which gas may be injected into the premix. The lance will be moved through the premix during gas injection to provide a distribution of bubbles appropriate to achieve the desired porosity profile. This may be achieved in a variety of ways. For instance, sparging may take place using a perforated lance, or series of lances, running the length of the formwork. The lance is initially located at the bottom of the formwork and withdrawn vertically through the cast premix. During this withdrawal the rate of sparging may be manipulated in order to effect gas distribution within the premix. The same effect may be achieved by varying the rate of withdrawal of the sparging lance to effect increased gassing in certain regions of the premix. In another technique, a sparging lance extending over the depth of the cast premix may be moved through the premix along the length of the formwork (from one side of the formwork to another rather than from the bottom to the top of the cast premix). In this case the lance may have a perforation profile such that the amount of gas introduced along its length varies according to the bubble distribution it is desired to impart. In both cases the viscosity of the premix will be an important factor. The premix should be sufficiently viscous to achieve bubble retention but not so highly viscous so as to inhibit bubble formation. The viscosity of the premix will also influence the pressure at which the gas is injected. The rate at which the lance is moved through the premix should avoid undue turbulence in the premix as this may impact on the distribution of gas bubbles introduced. During or after sparging the premix may be subjected to confinement as described above.

A product having a distinct step-wise porosity profile may be produced by providing individual layers (or strata) with the requisite porosity. For instance, a layer having a relatively low porosity (high density) may be formed at the bottom of a formwork by one of the techniques described. Further premix may then be introduced and processed (as described herein) in order to produce a higher porosity layer/region. This may be repeated to provide discrete layers having designed porosity profile. Partial curing of "individual" layers may be required to prevent mixing of individual layers. The resultant product has relatively distinct boundaries between regions of different porosity, but is monolithic and unlikely to suffer incompatibility problems as between these regions.

Gassing of the premix results in a reduction in strength commensurate with the reduction in density caused by the gassing. Thus, in accordance with the invention, for a given premix of a particular specific strength, it is possible in accordance with the invention to manufacture products having a range of strength to density ratios by varying the extent of gassing. It is also possible to control the density (and strength) of the product formed in accordance with the present invention by varying the extent to which bubbles generated in the premix are collapsed. This may be achieved by varying the degree of confinement of the expanding premix. For a given initial volume of premix before expansion begins in a fixed volume of the formwork mould, the degree of confinement that is achieved ultimately is governed by the amount of additional volume change that is allowed to occur within the confined formwork. A premix that is allowed to expand more will show a lower density compared to a premix that is allowed to expand less. Varying the confinement of the expanding premix therefore offers a convenient and relatively simple means for influencing product characteristics. Advantageously, the invention therefore permits the properties, specifically the strength to density ratio, of the cementitious product to be tailored without having to change the mixture design. Accordingly, in another embodiment, the present invention provides a method of manufacturing at least two cementitious products which are formed from a single (i.e. the same) premix and which have a different ratio of strength to density. In this embodiment, the at least two cementitious products are formed in accordance with the method described herein and the strength to density ratio of each cementitious product is controlled by varying the degree of confinement of the premix as it expands due to generation of gas bubbles within the matrix. Products manufactured using the confined casting method may produce flexural strength up to 30% higher, compressive strengths up to 15% higher and water sorptivity up to 50% lower than that of a product made conventionally.

The strength to density ratio of cementitious products formed in accordance with the present invention may also be achieved based on selection of premix strength. Thus, for premixes of similar density which are gassed to the same extent during product formation, a premix of relatively high strength will produce a product having a higher strength to density ratio than a premix of relatively low strength. This allows greater flexibility in product manufacture because varying the density alone of a single premix (by gassing) may not result in a product having the desired strength to density ratio.

After the desired porosity profile has been achieved, the method involves heat curing the premix to achieve the required strength for handling, transport and in-service performance. Heat curing typically takes place under atmospheric pressure. Typically, the 1-day strength of the product after steam curing is in the range of 8-10 MPa but may exceed 15 MPa depending on the mix design.

Prior to curing the upper surface of the product may be finished by conventional techniques such as cutting, screeding, trowelling, and/or rolling. As noted earlier, screeding and trowelling may involve vibration of the screed or trowel used. This finishing may help to produce a smooth surface finish suitable for surface treatment such as painting. This said, this may not be necessary if the product already has suitable surface properties.

Advantageously, the method of the invention results in a cementitious product having a characteristic porosity profile and this may impart beneficial properties to the product. Thus, the product has relatively less matrix material at its core region (due to higher porosity there) and more matrix material in its outer regions (due to reduced porosity there). This structure may confer advantageous load-bearing properties when compared to a monolithic (block) cement product having the same macroscopic shape but with a homogeneous porosity and density. The distribution of matrix material in the product formed in accordance with the invention may cause the product to behave like an I-section component and this may lead to improved resistance to bending and buckling as a result. The products of the invention have dense outer regions and this structure may also confer advantages in terms of product properties. The presence of dense outer regions, preferably as consolidated dense outer skins, may impart impact resistance, abrasion resistance and resistance to water absorption. The presence of smooth outer skins (as may be prepared by pre-curing finishing) may also mean that the product is more amenable to surface treatment such as painting without the need to render the surface. Some cellular concrete products tend to be manufactured by cutting of monolithic blocks, thus exposing pores and voids on the surface of the product. The products of the present invention are superior due to the presence of dense and preferably consolidated outer regions of the product. A wide range of decorative architectural finishes, patterns or textures may also be applied during casting by either placing appropriate templates or inclusions on the bottom of the formwork prior to casting or applying these on the top surface before the product hardens.

The present invention also provides a porous cement product having the kind of porosity profile as described herein. The products may be prepared by the method of the present invention.

It will be appreciated that the porosity profile of products formed in accordance with the present invention will vary depending upon the cross-section through the product along which the profile is determined. The orientation of the cross-section over which the porosity profile is observed is related to the way in which the products are prepared, as should be clear from the earlier description of the method of the invention. Over certain cross-sections the products of the present invention will exhibit no significant variation in porosity. For example, there is likely to be very little variation in porosity over a cross-section which is perpendicular to the cross-section over which the desired porosity profile is observed.

In the porous cementitious products of the invention the porosity is relatively low at the outer surfaces of the product and increases away from the outer surfaces along the relevant cross-section. This means that, over that cross-section, the products have a relatively low density (more porous) core region and higher density (less porous) outer regions. Typically, the average pore size also varies gradually along the relevant cross-section. This means that, along that cross-section, the porosity increases away from an outer surface of the product, peaks at some point within the bulk of the product and decreases towards the other outer surface. Such a distribution may be represented by a relatively smooth curve (of distance along cross-section versus porosity). Ideally, the distribution may be smooth and symmetrical, such as that represented by a normal bell-shaped distribution curve, although in practice the distribution curve is likely to be asymmetrical.

Thus, the maximum porosity may not actually occur at the mid-point of the relevant cross-section. It is important however that the product includes relatively dense outer regions and a relatively less dense inner (or core) region.

In one embodiment the porosity varies in step-wise fashion along the relevant cross-section, each step representing a clear demarcation between regions along the cross-section having a particular average pore size. In its simplest terms the product may comprise an outer region having a relatively low porosity, an inner region having a higher porosity, and another outer region having a relatively low porosity (which may be the same as or different from the first mentioned outer region).

The porosity profile of a given product may be determined by image analysis techniques, as are well known in the art. In practice the product is cut along a selected cross-section and the cross-section imaged and segmented digitally into layers. The pores (appearing as voids or bubbles) are then counted and the pore area expressed as a percentage relative to the total area of the segment under examination. The value obtained is an estimate of the porosity of the segment. A porosity profile for a particular cross-section can be developed by plotting percentage porosity against position along the cross-section (often the depth from the top surface of the sample along the cross-section is used here). As explained earlier, the porosity increases along the relevant cross-section away from the outer surfaces of the product.

Typically, the maximum porosity of products in accordance with the present invention is from 25 to 60%, preferably from 25 to 45%. This maximum is generally observed over a region corresponding to 20 to 80%, preferably 40 to 60%, along the thickness of the chosen cross-section. The minimum porosity of products in accordance with the invention is usually less than 20%, preferably less than 10%. This minimum is generally observed in the outer regions of the product, for instance 20% or less, preferably 40% or less, along the thickness of the chosen cross-section away from the outer surfaces of the product. It will be appreciated that this implies that the products will include a relatively porous, low density core region and relatively non-porous, high density outer regions. A porosity of less than 10% corresponds to a relatively dense structure and this may be observed at the outer surfaces of the product extending inwards along the relevant cross-section. When present, the thickness of this dense layer (or skin) is typically about 10% of the thickness of the product along the cross-section.

In a preferred embodiment the premix used is a high strength premix having a compressive strength of from 60 to 120 MPa (in non-gassed form). Such a premix enables products having a relatively high strength to density ratio to be produced. Thus, such products typically have a relatively low density, e.g. dry densities ranging from 1000 to 1500 kg/m$^3$, and a relatively high compressive strength, e.g. ranging from 10 to 25 MPa. Such products have sufficient compressive strength for load-bearing performance but at a significantly reduced weight. In fact, the present invention enables products to be prepared having a strength to density ratio that is almost twice that of existing lightweight cementitious products used in the building industry.

A gassed product manufactured using a relatively high strength premix may have a relatively low water content, for example from 12-15% (after curing autoclaved products tend to have a moisture content of from 25-35%). This low residual water may be achieved as a result of using a superplasticiser. The product obtained advantageously exhibits relatively high early age strength, particularly with the aid of accelerated heat curing, the use of high early strength cement or other appropriate accelerating agents or admixtures. A relatively high rate of early strength development provides the benefit of minimising damage during formwork stripping, as well as minimising the risk of handling damage, chipping and breakage during transportation and construction activities, such as lifting and installation. Such types of damage are commonly observed in many lightweight products of relatively low strength to density ratio. Thus, formation of a relatively high strength cementitious product can be beneficial even when such properties are not needed for functional or performance requirements (e.g. the application may not be a load bearing one).

In the present invention, the use of a relatively high strength premix may enable the manufacture of products having 1-day strength which is not far removed from the product strength at 28-days. For instance, use of a relatively high strength premix may result in a product having 1-day strength of from 75-90% of its strength after 28-days. Typically, use of a relatively high strength premix results in products having a 1-day flexural and compressive strengths in the gassed product of at least 3 and at least 15 MPa, respectively. These properties are usually obtained under heat accelerated curing conditions. The product may be produced by heat curing at atmospheric pressure. This 1-day strength value exceeds the requirements of 'green strength' generally used as a guide for removal of formwork in pre-cast concrete manufacturing. For instance, normal density concrete panels may be stripped from a formwork and lifted when its compressive strength is in the vicinity of 12-15 MPa.

In terms of mechanical properties, products of the invention generally exhibit flexural strengths in the range of 3-4 MPa for compressive strengths of from 15-20 MPa, e.g. from 15-18 MPa, for product densities of from 1300-1500 kg/m$^3$. This result for flexural strength is significantly higher than that normally achieved in normal density concrete of similar compressive strengths and may be attributable to the presence of a relatively dense outer skin of the product.

In accordance with the invention it is possible to prepare products having a thermal conductivity of from 0.3-0.6 W/m·K for product dry densities of from 900-1300 kg/m$^3$, e.g. from 0.3-0.5 W/m·K, for product dry densities of from 900-1200 kg/m$^3$. This is between 3-6 times lower than normal weight concrete of the same strength. Many existing materials aim to achieve a balance between strength, weight and thermal performance by laminating materials of different densities in a composite action, e.g. fibre cement sheet with polystyrene concrete/sheet in-fill. These composite materials have distinct disadvantages due to incompatibility of materials, potentially poor adhesion between composite layers, reduced recyclability due to mixed material content and variable rates of ageing and differential shrinkage for different layers of materials within the composite. The cementitious products of the present invention avoid all these problems.

In summary and in no particular order, relative to conventional technology, the key advantages associated with the present invention include the following:

1. The invention can be applied to manufacture products having high strength to density ratio by gassing of a very high strength cementitious matrix.
2. The process by which the products are manufactured has great flexibility based on confined/restrained gassing which produces different quality/grades of product with one single set-up and mixture design.
3. The control of casting and gassing efficiency may be achieved through the use of high range superplasticisers to regulate rheology of the mixture. This allows products to be produced with relatively low water content with consequential advantages in terms of early age strength and reduced residual free moisture content.
4. The invention can be applied to manufacture a monolithic product with relatively strong outer skins without the problems suffered by laminated composites which use separate layers of material of different density. Such composites can often exhibit incompatability/delamination at materials interfaces.
5. The manufacturing process of the invention is a relatively low energy process in comparison with the use of (steam) autoclaves to manufacture such products. Autoclaves tend to be extremely expensive and can introduce excess moisture into the product formed. This can adversely affect the dimensional stability of the product in service as the product dries out. Furthermore, the time taken for water equilibriation may have implications for product shrinkage as well as surface finish quality.

The products of the present invention may take a variety of forms depending upon their intended use. For instance, the products may be provided in the form of flat slabs, wall panels, roofing tiles, block-work systems and pavers. The products are particularly suitable for use in the construction industry as building materials and, in particular, in load bearing applications. Here the invention may provide a number of advantages including:
(a) reduced materials usage;
(b) reduced structural dead-loads which impact on the size of foundations and structural elements;
(c) potentially improved thermal performance;
(d) improved performance under dynamic loads e.g. earth quakes;
(e) improved construction efficiency through reduction in lifting loads and cranage requirements;
(f) reduced transportation energy; and
(g) enhanced fire rating.

The cementitious products of the present invention may include conventional reinforcing components, such as steel rods or mesh, as might be required in certain applications. In this case the reinforcing element(s) is/are positioned appropriately in the premix during manufacture of the cementitious product as described herein. Usually, the reinforcing element (s) will be held in the desired position in the premix until suitable curing has taken place. Here the reinforcing element (s) may be attached to or supported by the formwork into which the premix is introduced. It will be appreciated that the methodology described herein to achieve a desired porosity profile may vary depending upon the type and/or orientation of reinforcing element(s) used in a premix. For instance, it may not be possible to distribute gas bubbles in a premix using a sparging lance if the reinforcing element(s) used will impede the requisite movement of the lance through the premix.

When steel or similar reinforcement is used, a dense outer skin on the product may also contribute to product durability by providing water resistance, thereby minimising or preventing corrosion of the reinforcing element(s).

The following non-limiting examples illustrate the present invention.

EXAMPLE 1

A suitable premix has the following formulation
Portland cement 75-100% by weight ratio of total binders
Fly Ash—0-15% by weight ratio of total binders
Silica Fume—0-10% by weight ratio of total binders
Silica Flour—0-10% by weight ratio of total fine aggregate filler
Sand—a well graded relatively fine grained silica sand, or equivalent, with maximum size not exceeding 600 microns at sand to binder weight ratios ranging between 1:1 up to 2:1 with the lower sand content being preferable when producing mixes with relatively higher strength to density ratios. The sand grading may be modified to incorporate a small percentage (up to 30%) of relatively coarser materials in the size range of 1.2-2.4 mm to improve compaction and to mitigate shrinkage where applicable.
Water at quantities ranging between 270-330 liters per cubic meter of fresh mortar mixture
Superplasticisers—in the range between 10-20 liters/cubic meter of fresh mixture in the case of high end lignosulphonate superplasticisers or 5-10 liters/cubic meters of fresh mixture in the case of polycarboxylate superplasticisers. The dosage used being related to controlling the viscosity of the mix to enable both self-leveling behaviour to assist casting but with sufficient viscosity to entrap the gas bubbles that are generated
Aluminium based aeration/gassing compound at between 0.1-0.2% by weight of Portland cement content The unfoamed mortars produced according to the relative mixture proportions described typically achieve compressive strengths ranging between 60-120 MPa at ages between 7-28 days depending on the method of curing. With the introduction of gas bubbles, mortar mixtures with compressive strengths in the range of 60-120 MPa will produce a finished lightweight product with compressive strength ranging between 10-25 MPa and air dried densities in the range of 1000-1500 kg/m$^3$. The use of a relatively high strength matrix in the unfoamed mortar also enables a relatively high early age strength to be obtained in the expanded product, allowing the product to be removed from the formwork with a reduced risk of breakage. Typically the 1-day strength of the foamed product after heat curing is approximately 75-90% of its 28-day strength.

EXAMPLE 2

Forming a Finished Product from a Suitable Premix

In this example a panel is produced approximately 0.6 m wide and 1.8 m long with thickness of from 75-100 mm.

In general terms the method involves mixing wet and dry materials using a suitable mixing process, pouring the premix into formwork mould with confinement, providing vibro-compaction as required, finishing the surface as required, and curing the product and removing formwork after the curing period. The overall production cycle used is approximately 22 hours long and the table below shows what is involved.

| Activity | Activity time (hrs) | Cumulative process time (hrs) |
| --- | --- | --- |
| Mixing | 0.25 | 0.25 |
| Casting | 0.25 | 0.5 |
| Waiting time prior to finishing | 1.5-3.5 | 2-4 |
| Finishing | 0.25 | 2.25-4.25 |
| Transporting to curing chamber | 0.25 | 2.5-4.5 |
| Heat curing (plus cool down) | 16 | 18.5-20.5 |
| Stripping | 0.5 | 19-21 |
| Cleaning of formwork for next pour | 1 | 20-22 |
| Total cycle time | | 20-22 |

Binders containing very fine pozzolans such as silica fume may require longer periods of setting prior to finishing due to the higher superplasticiser contents used. However, the extended setting period is mitigated by the elevated temperature of the fresh mix in the mould which is typically between 35-40° C. under standard laboratory conditions.

The mixing step involves a series of individual steps as illustrated in the following table

| Step | Action | Time per stage (mins) |
|---|---|---|
| 1 | Add all mix water in the mixing bowl with approximately 75% of the required superplasticiser. (Mix water temperature is 70° C.) | 0 |
| 2 | Start the mixer at slow speed and gradually add all cement over a 3 minute period | 2-3 |
| 3 | Add other binder materials (eg Silica fume or silica flour) over the next 2 minutes. Increase mixer speed. | 1-2 |
| 4 | Add sand over the next 3 minutes - mixer at high speed. Add remaining 25% superplasticiser (Optional rest period of approx 1 minute, scraping down if necessary) | 2-3 |
| 5 | Allow to mix for a further 2-3 minutes - mixer at high speed | 2-3 |
| 6 | Add Aluminium suspension and allow 30-60 secs of mixing at high speed | 0.5-1 |
| 7 | Stop mixer and position mixing bowl for pouring | 1 |
| 8 | Complete pouring into formwork mould | 1 |

The fresh premix is poured into the formwork mould, under-filling at the required level (typically about 70% of the final product thickness). Appropriate vibration is provided vertically (e.g. 50 Hz) and/or laterally (e.g. at 1 to 5 Hz) to promote self-levelling, maintain consistency and rheology of the mix during gas evolution in order to achieve required volume change. A top plate assembly is placed onto the formwork and clamped down to provide confinement. The top plate is removed at between 30-60 mins after casting by which time no residual volume change occurs and the formed mix is sufficiently firm for the top plate to be removed. This period may vary depending on the ambient temperature conditions with a slightly longer period required under cooler conditions.

When a top confining plate is used, the formed top surface is flat and requires only minimal trimming to remove excess mortar on the side perimeter. This surface can be finished using a variety of methods. However, it is preferably rolled with a smooth steel roller, which aids in forming a dense crust on the top surface.

The time required before finishing takes place can be influenced significantly by the mix design, the ambient temperature conditions and the product temperature during the setting process. Typically, panels can be finished within 2 hours of casting. Additionally, the time taken for finishing may also vary with the method used for finishing the surface e.g. screeding, trowelling and rolling that may be used to introduce a confining effect. The influence of these materials and manufacturing parameters on the time required before finishing can be verified experimentally depending on the actual mix designs used and manufacturing conditions. For panels manufactured without confinement, the excess material above the formwork can be cut or screeded off and the product finished in the same way as the confined panel.

The formwork is moved to the curing chambers after the finishing operations. This is typically carried out between 2-4 hours after casting. Care needs to be taken when doing so since the mortar is not yet sufficiently hardened to resist any sharp jolts or other impact loads due to transportation. Stiffening of the formwork bases will also assist in mitigating any flexural bending that may cause the panels to crack prematurely. Side forms remain on the formwork and are only removed after the full curing cycle.

Figure 1:
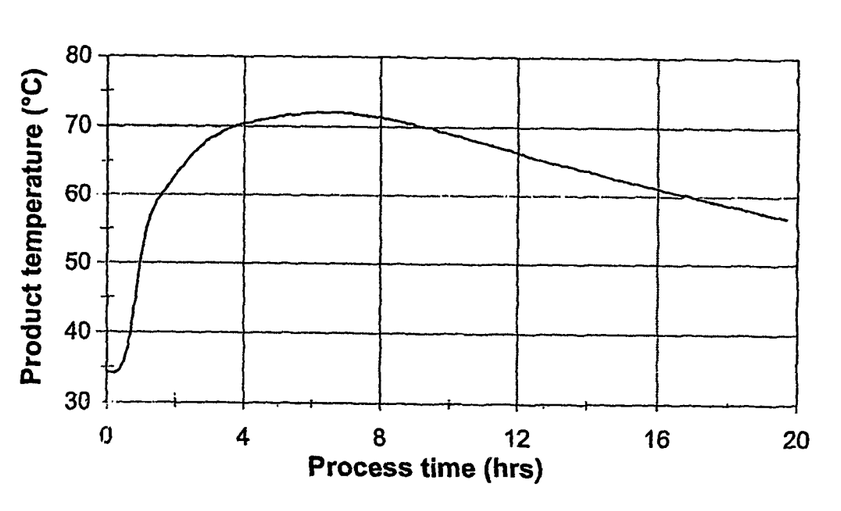

Heat curing is used to obtain a realistic production cycle within a 24-hour period so that the formwork can be re-used at a reasonable rate. Typically the product temperature at the start of the heat curing cycle is between 35-40° C. The temperature of the product is controlled during the heat curing stage by means of an embedded thermocouple that is connected to a PC-based control system. A typical temperature profile measured at mid-point within a 100 mm thick sample is shown in FIG. 1. The main features of this temperature profile are:

heating up phase at an average rate of 15° C./hour
maximum temperature of approximately 70° C.
gradual cool down phase to about 30-40° C. prior to stripping In the process shown, the chamber was self-cooled over a period of time after the steam is shut off. The cumulative maturity of the product at the time of stripping is about 500° C.·hr (Cumulative maturity calculated as the sum of temperature and time, i.e. $\Sigma(T-T_0)\delta t$ where $T_0=0°$ C.). The gradual heating up and cooling down simulates one possible practical curing scenario where a stack of products are moved through a heat curing tunnel which is nominally cooler at the entry and exit ends but has a relatively hotter section in the middle.

EXAMPLE 3

The following example describes the formation and properties of a panel product, typically 0.6 m wide×1.8 m long and with thicknesses ranging between 75-100 mm. The product is manufactured as per the methodology of Example 2 using a mixture formulation having the composition given below. The panels are reinforced with one layer of steel mesh reinforcement placed centrally at mid-thickness. In the case of structural load bearing elements, F62 mesh is used whilst for all other cases, a nominal F42 mesh is used.

|  | Quantities per m³ of Un-aerated mix (Quantities per m³ in aerated mix) |
|---|---|
| Type GP Cement (kg) | 865 (502) |
| Silica fume (kg) | 96.2 (56) |
| Sand (kg) | 961.6 (557) |
| Water (kg) | 309.1 (180) |
| Superplasticiser (Adva 135) (liter) | 9.6 (5.5) |
| Aluminium paste (Eckart AC-33) (kg) | 0.7-1.1 (0.5-0.7) |
| Fresh yield (kg/m3) | 2245 |
| Premix wet density (kg/m3) | 1300 |

Typical performance data for the panels produced include:—
   Panel dry density (under standard laboratory conditions) between 1300-1500 kg/m³ with compressive strength up to 20 MPa and flexural strengths up to 4 MPa
   Relatively low 56-day drying shrinkage of 500 microstrain with predicted ultimate shrinkage below that of a typical 30-year design shrinkage for internal environments
   Relatively low thermal conductivity of 0.6 W/m·K which is between 2-3 times lower than normal density concrete
   Good insulation against fire of greater than 2 hours
   Good durability potential with a 24-hour depth of water sorptivity of ~10 mm, exceeding AS3600 requirements for exposure classification B2
   Good resistance against hard impact, with this product providing impact resistance equivalent to normal density concrete of similar strength and being only 30% less impact resistant when compared to normal density concrete of twice the strength.

Good pullout strength in excess of 3 kN, providing sufficient capacity for fixing wall attachments (e.g. kitchen cabinets) weighing 200 kg per lineal meter Should not exhibit differences in serviceability failure rates under handling conditions when compared to normal strength concrete or normal density concrete Adequate capacity to resist ultimate strength and serviceability limit state wind loads The claims defining the invention are as follows:

1. A method of manufacturing a porous cementitious product, which method comprises in the following order:
   (a) forming a cementitious premix including sand as aggregate by mixing premix components with water;
   (b) mixing the cementitious premix formed in (a) with a heat-activated gas-generating agent and then immediately casting the premix in a desired configuration in a formwork, wherein the premix is sufficiently viscous to achieve gas bubble retention but not so highly viscous so as to inhibit formation and migration of gas bubbles, and wherein the formwork is underfilled by from 30 to 50% based on the volume of the formwork;
   (c) allowing gas bubbles to be generated within the premix by reaction involving the heat-activated gas-generating agent thereby causing the premix to expand in the formwork;
   (d) collapsing the expanding premix at its upper surface by contacting with a formwork lid or by subjecting the upper surface to trowelling, screeding and/or rolling; and
   (e) curing the premix,
   wherein gas bubbles are generated and/or collapsed at specific locations within the premix in order to produce a porosity profile along a cross-section of the product such that the product comprises a relatively low density core region and higher density outer regions.

2. A method according to claim 1, wherein the lid of the formwork is adapted to allow gas dissipation when gas bubbles collapse at the premix/lid interface.

3. A method according to claim 1, wherein, after casting but before curing of the premix, the upper surface of the premix is subjected to trowelling, screeding and/or rolling in order to cause collapsing of expanding premix.

4. A method according to claim 1, wherein, after casting but before curing of the premix, the formwork is vibrated vertically and/or laterally at an appropriate frequency and amplitude in order to achieve an even distribution of premix within the formwork, to control the cross-sectional bubble distribution and/or to improve smoothness of the product surfaces.

5. A method according to claim 1, wherein a formwork is used for shaping the premix and wherein the formwork is vibrated vertically and/or laterally at an appropriate frequency and amplitude in order to achieve an even distribution of premix within the formwork, to control the cross-sectional bubble distribution and/or to improve smoothness of the product surfaces.

6. A method according to claim 1, wherein, after casting but before curing of the premix, a sparging lance is used to inject gas at selected locations into the premix.

7. A method according to claim 6, wherein the sparging lance comprises an elongate hollow member having a series of holes through which gas may be injected into the premix.

8. A method according to claim 7, wherein the sparging lance is moved through the premix during gas injection to provide a distribution of bubbles appropriate to achieve the desired porosity profile.

9. A method according to claim 1, wherein, after casting but before curing of the premix, the premix is sufficiently viscous to achieve gas bubble retention but not so highly viscous so as to inhibit bubble formation.

10. A method according to claim 1, wherein the viscosity of the premix is controlled by varying the premix temperature, by blending of fine materials into the premix to obtain desired particle graduation for optimal flow properties and/or by incorporation into the premix of a superplasticising admixture.

11. A method according to claim 10, wherein the viscosity of the premix is controlled by incorporation into the premix of a superplasticiser.

12. A method according to claim 1, wherein the strength to density ratio of the cementitious product is controlled by varying the extent to which gas bubbles that have been generated in the premix are retained.

13. A method according to claim 1, wherein the strength to density ratio of the cementitious product is controlled by varying the degree of confinement of the premix as it expands due to generation of gas bubbles within the premix.

14. A method according to claim 1, wherein the strength to density ratio of the cementitious product is controlled by selection based on premix strength.

15. A method according to claim 1, wherein after casting but prior to curing of the premix, an upper surface of the premix is finished by cutting, trowelling, screeding or rolling.

16. A method according to claim 1, wherein the premix is a high strength premix that on curing would yield a product having a compressive strength of from 60 to 120 MPa (in non-gassed form).

17. A method according to claim 16, wherein the premix is used to manufacture a cementitious product having a dry density of from 1000 to 1500 kg/m$^3$ and compressive strength of 10 to 25 MPa.

18. A method according to claim 16, wherein the cementitious product has a 1-day strength of from 75-90% of its 28-day strength.

19. A method according to claim 18, wherein curing of the premix takes place using heat at atmospheric pressure.

20. A method according to claim 16, wherein the cementitious product has residual water content of from 12-15% by weight.

21. A method according to claim 1, wherein the cementitious product exhibits a flexural strength of from 3-4 MPa for compressive strengths of from 15-20 MPa for product densities of from 1300-1500 kg/m$^3$.

22. A method according to claim 1, wherein the cementitious product has a thermal conductivity of from 0.3-0.6 W/m·K for product dry densities of from 900-1300 kg/m$^3$.

23. A method according to claim 1, wherein high shear mixing is used to vary the premix temperature and/or the premix rheology thereby allowing the viscosity of the premix to be controlled prior to casting.

24. A method according to claim 1, wherein the cementitious product is manufactured in the form of a flat slab, wall panel, roofing tile, block-work system or paver.

25. A method according to claim 1, wherein the formwork includes surface relief in order to produce a patterned surface on the product.

26. A method of manufacturing at least two cementitious products which are formed from a single cementitious premix and which have a different ratio of strength to density, which method comprises forming each cementitious product in accordance with the method claimed in claim 1 and wherein the strength to density ratio of each cementitious product is controlled by varying the degree of confinement of the premix as it expands due to generation of gas bubbles within the matrix.

27. A cementitious product obtained by the method as claimed in claim 1.

28. A method according to claim 1, wherein the premix is confined in the formwork in order to contribute to the desired porosity profile.

29. A method according to claim 1, wherein the cementitious product has a consolidated, dense outer skin.

* * * * *